(12) United States Patent
Dimitrova et al.

(10) Patent No.: US 12,208,836 B2
(45) Date of Patent: Jan. 28, 2025

(54) VEHICLE PROVIDED WITH A SHOCK-ABSORBING DEVICE FOR A GAS TANK

(71) Applicant: STELLANTIS AUTO SAS, Poissy (FR)

(72) Inventors: Zlatina Dimitrova, Versailles (FR); Marc Peru, Chatenay Malabry (FR)

(73) Assignee: STELLANTIS AUTO SAS, Poissy (FR)

( * ) Notice: Subject to any disclaimer, the term of this patent is extended or adjusted under 35 U.S.C. 154(b) by 0 days.

(21) Appl. No.: 18/559,753

(22) PCT Filed: Mar. 30, 2022

(86) PCT No.: PCT/FR2022/050596
§ 371 (c)(1),
(2) Date: Nov. 8, 2023

(87) PCT Pub. No.: WO2022/248783
PCT Pub. Date: Dec. 1, 2022

(65) Prior Publication Data
US 2024/0262423 A1 Aug. 8, 2024

(30) Foreign Application Priority Data
May 28, 2021 (FR) ...................... 2105560

(51) Int. Cl.
*B62D 21/15* (2006.01)
*B60K 15/03* (2006.01)
(Continued)

(52) U.S. Cl.
CPC ............. *B62D 21/15* (2013.01); *B60K 15/07* (2013.01); *B62D 21/08* (2013.01); *B60K 2015/03315* (2013.01); *B60K 2015/0675* (2013.01)

(58) Field of Classification Search
CPC ........ B62D 21/15; B62D 21/08; B60K 15/07; B60K 2015/03315; B60K 2015/0675
(Continued)

(56) References Cited

U.S. PATENT DOCUMENTS 9,174,531 B2 * 11/2015 Finck ............... B60K 15/03006
2006/0032532 A1 * 2/2006 Suess .................... F17C 13/083
137/266

FOREIGN PATENT DOCUMENTS

| CN | 110525204 A | 12/2019 |
| CN | 212604496 U | 2/2021 |

(Continued)

OTHER PUBLICATIONS

International Search Report for PCT/FR2022/050596 mailed on Jul. 13, 2022.
Written Opinion for PCT/FR2022/050596 mailed on Jul. 13, 2022.

*Primary Examiner* — Joseph D. Pape
*Assistant Examiner* — Dana D Ivey
(74) *Attorney, Agent, or Firm* — Sandberg Phoenix & von Gontard, PC (57) ABSTRACT

The invention relates to a vehicle, in particular a motor vehicle, comprising: —gas tanks (12), such as hydrogen tanks, and
a tray (13) for receiving the gas tanks (12) comprising a frame (15) formed by side members (16) and side flanges (17),
said vehicle further comprising a shock-absorbing device (21) arranged at least between one side flange (17) of the tray (13) for receiving the gas tanks (12) and at least one portion of a side face of a gas tank (12) and/or between at least two portions of two side faces of two adjacent gas tanks (12), so as to be able to at least partially absorb by buckling an impact of the vehicle.

12 Claims, 8 Drawing Sheets

(51) Int. Cl.
  *B60K 15/067* (2006.01)
  *B60K 15/07* (2006.01)
  *B62D 21/08* (2006.01)
(58) Field of Classification Search
  USPC .................................................. 296/187.12
  See application file for complete search history.

(56) References Cited

FOREIGN PATENT DOCUMENTS

EP          0687587  A1    12/1995
FR          3031491  A1     7/2016

\* cited by examiner

VEHICLE PROVIDED WITH A SHOCK-ABSORBING DEVICE FOR A GAS TANK

CROSS-REFERENCE TO RELATED APPLICATIONS

This application is the US National Stage under 35 USC § 371 of International Application No. PCT/FR2022/050596, filed Mar. 30, 2022, which claims the priority of the French application No. 2105560 filed on May 28, 2021, the content (text, drawings and claims) of both said applications being incorporated by reference herein.

BACKGROUND

The devices described herein generally relate to the field of vehicles having as fuel a gas such as hydrogen, and in particular fuel cell electric vehicles. More particularly, a vehicle, in particular a motor vehicle, provided with a shock-absorbing device for a gas tank, such as a hydrogen tank, is described.

Hydrogen tanks on board vehicles are usually cylindrical shaped bottles. In a bottle, the hydrogen is stored in gaseous form at high pressure, typically at a pressure of 700 to 800 bar. This technology makes it possible to store sufficient hydrogen to grant a range of 500 km to 600 km to a motor vehicle equipped with a fuel cell.

In general, the use of hydrogen as fuel in a vehicle poses a safety problem related to the risk of leaks and explosions which may occur in the event of impacts or fires. Thus, hydrogen tanks on board vehicles are subject to standards that especially deal with their service life, impermeability, impact protection and other safety related aspects.

Protection against impacts, and in particular side impacts, requires special attention given the possible consequences. The installation of hydrogen tanks in a central zone of the vehicle facilitates the presence of deformation zones capable of absorbing part of the energy of the impact. The installation of the hydrogen tanks under the vehicle body is an interesting solution making it possible to maintain convenient volumes in the luggage compartment and the passenger compartment. The under-shell mounting offers greater availability of space which facilitates better optimization of the installation relative to the various constraints. In addition, in the event of overpressure in the hydrogen tanks, installation under the body facilitates escape and rapid diffusion of the gas in the open air, thus reducing the risk of explosion.

Furthermore, in order to satisfy standardization needs in the automobile industry, it is desirable for the solution for mounting gas tanks to be easily incorporated into an existing vehicle platform. It may thus be advantageous to reuse an electric energy storage battery tray for receiving the gas tanks.

Figure 1:
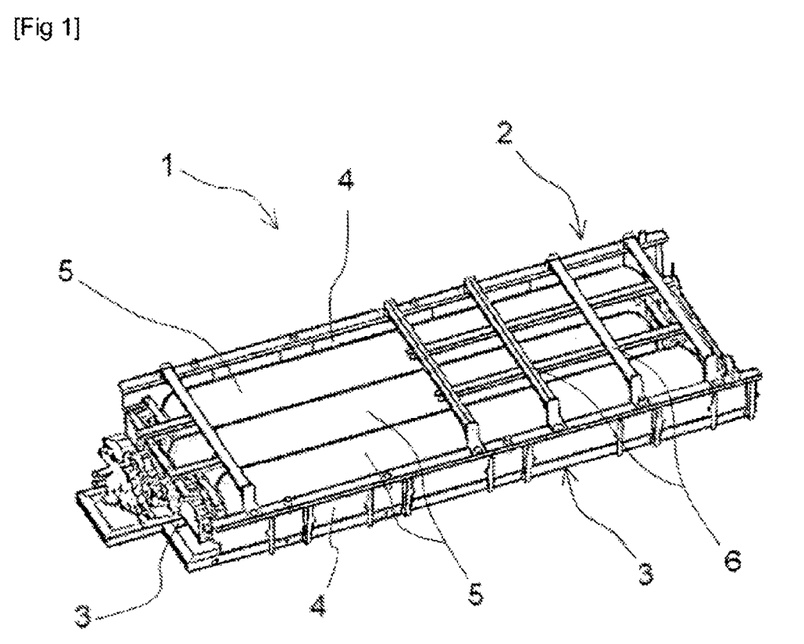
FIG. 1, already described, is a view of a tray of a motor vehicle containing gas tanks.

As shown in FIG. 1, such a battery tray 1 comprises a frame 2 formed by a plurality of longitudinal members 3 and side flanges 4. The gas tanks 5 arranged inside the tray 1 extend in a longitudinal direction of the vehicle. The tray 1 also comprises reinforcing cross-members 6 which make it possible to distribute a lateral impact force.

Figure 2:
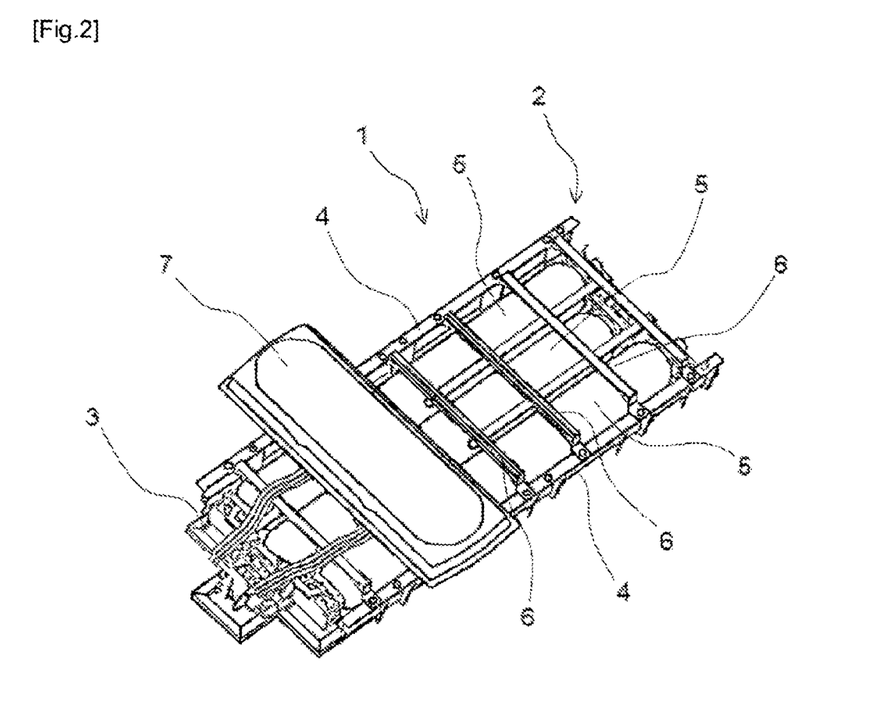
FIG. 2, already described, illustrates the incorporation of an electrical energy battery close to the receiving tray of the gas tanks.

However, according to certain vehicle configurations illustrated in FIG. 2, a long-range battery 7, called "Range Extender" battery, is provided. The installation constraints of such a battery 7 limit the number of cross-members 6 in an area of the tray 1 opposite where the battery 7 is disposed.

Figure 3:
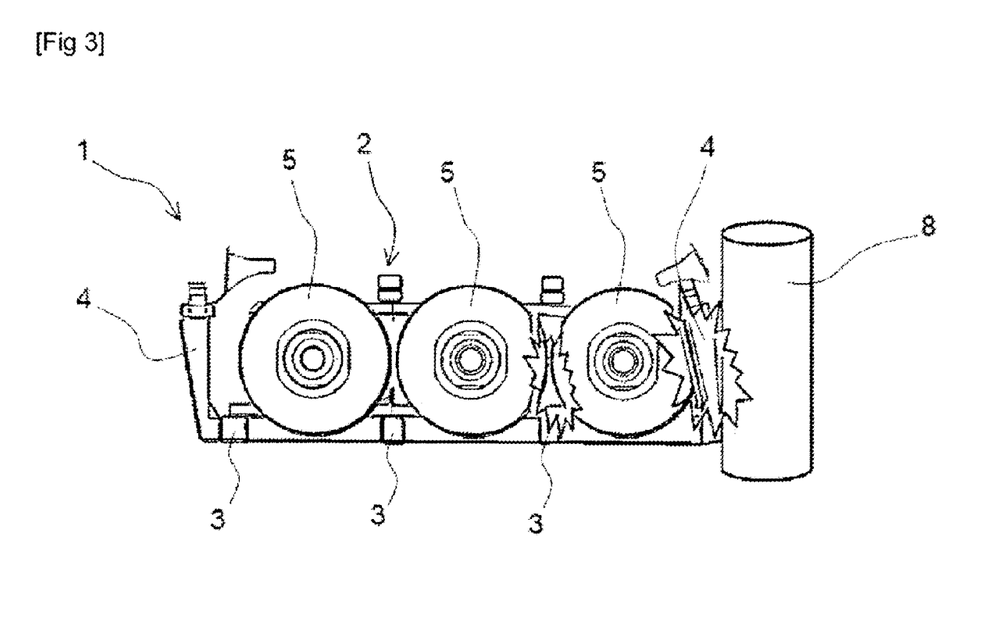
FIG. 3, already described, is a side view illustrating the buckling of a flange of the tray for receiving gas tanks in the event of a side impact in a zone with no reinforcing cross-member.

As can be seen in FIG. 3, in the event of a lateral impact occurring against a post 8 outside the area of the cross members 6, the side flanges 4 will flex. This causes a risk of damage to the tanks 5 and components of a high-pressure gas system, such as pipes and expansion valves.

SUMMARY

The described devices aim to effectively remedy the aforementioned disadvantages by proposing a vehicle, in particular a motor vehicle, comprising:
gas tanks, such as hydrogen tanks, and
a tray for receiving gas tanks comprising a frame formed by longitudinal members and side flanges,
said vehicle further comprising a shock-absorbing device arranged at least between one side flange of the tray for receiving gas tanks and at least one portion of a side face of a gas tank and/or between at least two portions of two side faces of two adjacent gas tanks, so as to be able to at least partially absorb by buckling an impact of the vehicle.

Thus it is possible, by virtue of the incorporation of the shock-absorbing device, to avoid a risk of damage to the gas tanks and the components of a high-pressure gas system irrespective of the zone of the tray in which a side impact occurs. It is thus possible to reuse an existing battery tray while overcoming any safety risk.

According to one embodiment, the tray for receiving the gas tanks comprising reinforcing cross-members, the shock-absorbing device is situated in a zone of the tray for receiving gas tanks with no reinforcing cross-member.

According to one embodiment, the shock-absorbing device comprises at least one attached side element arranged between a side flange of the tray and at least a portion of a side face of a gas tank and/or at least one attached intermediate element arranged between at least two portions of two side faces of two adjacent gas tanks, the attached side element and the attached intermediate element being elements distinct from one another.

According to one embodiment, the attached side element has an inner face in the form of a portion of a cylinder cooperating with a portion of a cylindrical side face of a tank and a face bearing against at least a portion of a side flange of the frame of the tray for receiving the gas tanks.

According to one embodiment, the attached intermediate element has two internal faces in the form of a portion of a cylinder each cooperating with a portion of a side face of a corresponding gas tank.

According to one embodiment, the attached side element and/or the attached intermediate element comprises at least one duct passage orifice.

According to one embodiment, the shock-absorbing device is configured so as to convert a concentrated force of the lateral shock into a uniform pressure field applied by the shock-absorbing device on a side face of a gas tank.

According to one embodiment, the shock-absorbing device comprises a hollow body in which ribs forming a plurality of hollow cells are provided.

According to one embodiment, the shock-absorbing device comprises a hollow body in which a plurality of spheres having a lattice structure are arranged.

According to one embodiment, the shock-absorbing device comprises a hollow body in which a plurality of cylinders having a lattice structure are arranged.

The description and its various applications will be better understood upon reading the following description and examining the accompanying figures. These figures are only given by way of illustration and are in no way limiting.

BRIEF DESCRIPTION OF THE FIGURES

FIG. 12b is a perspective view of a sphere with a lattice structure used in the embodiment of FIG. 12a.

FIG. 13b is a perspective view of a cylinder with a lattice structure used in the embodiment of FIG. 13a.

DETAILED DESCRIPTION

In FIGS. 4 and following, the identical, similar or like elements retain the same reference from one figure to another.

Figure 4:
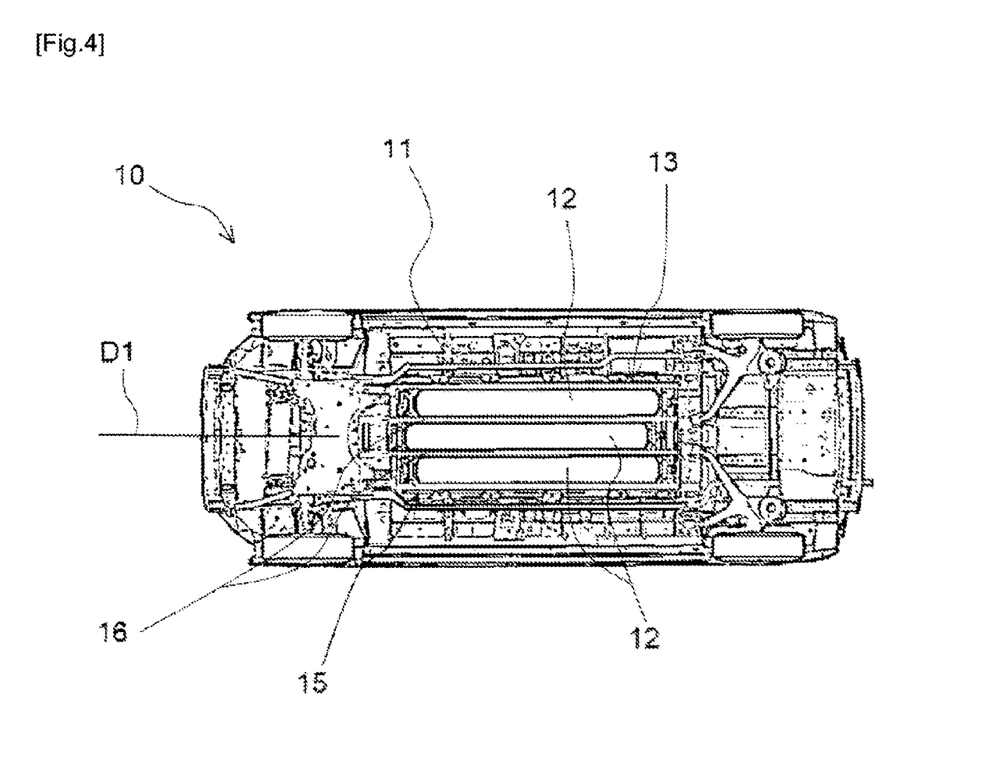
FIG. 4 is a bottom view of a motor vehicle incorporating a tray for receiving gas tanks.

FIG. 4 shows a motor vehicle 10 comprising a floor 11 having a longitudinal extension direction D1. Gas tanks 12, such as hydrogen tanks, are arranged inside a tray 13. The gas tanks 12 extend longitudinally along the longitudinal extension direction D1 of the floor 11. The gas tanks 12 advantageously take the form of cylindrically shaped bottles.

Figure 5:
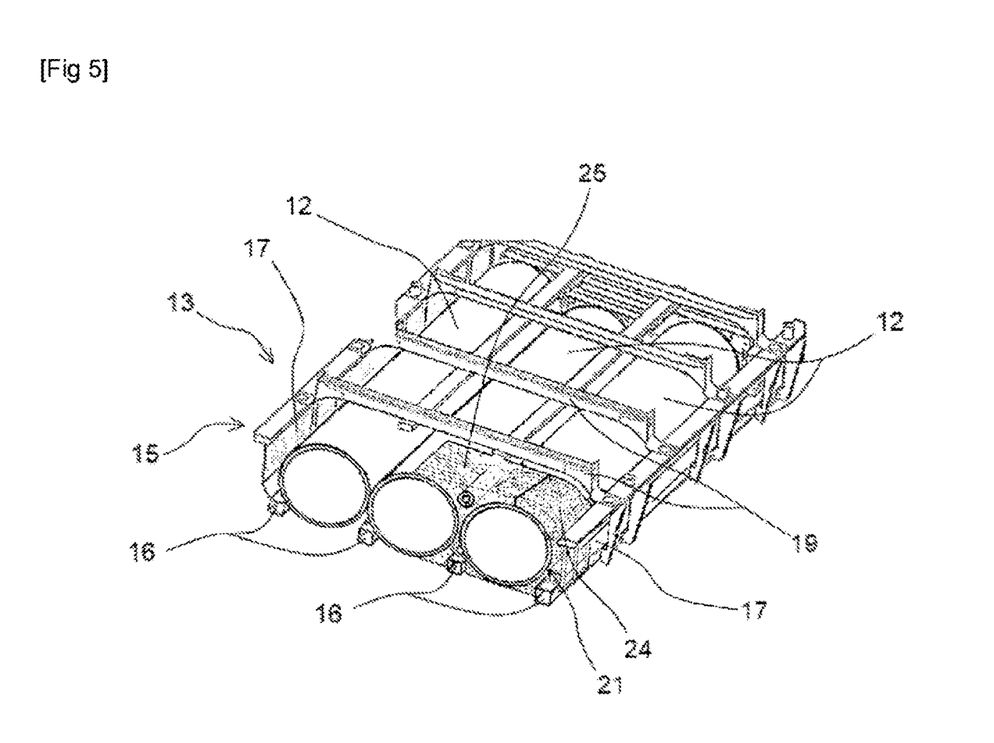
FIG. 5 is a perspective view of a tray for receiving gas tanks incorporating a shock-absorbing device.

As can be seen in FIG. 5, the tray 13 for receiving the gas tanks 12 comprises a frame 15 formed by a plurality of longitudinal members 16 extending longitudinally in the longitudinal extension direction D1 of the floor 11, and side flanges 17 extending along the direction D1 of longitudinal extension of the floor 11. The tray 13 also comprises reinforcing cross-members 19 which make it possible to distribute a lateral impact force. The reinforcing cross-members 19 extend in a direction perpendicular to the direction D1 in order to absorb lateral shocks.

Furthermore, a shock-absorbing device 21 is arranged at least between a side flange 17 of the tray 13 and a side face of a gas tank 12 and between two side faces of two adjacent gas trays 12, so as to be able to absorb by deformation at least in part a lateral impact sustained by the vehicle 10. The shock-absorbing device is advantageously located in an area of the tray 13 for receiving the gas tanks 12 without a reinforcing cross-member 19 to allow an electrical energy battery to be incorporated.

The shock-absorbing device 21 comprises at least one attached side element 24 arranged at least between a side flange 17 of the tray 13 and a side face of a gas tank 12 and at least one attached intermediate element 25 arranged between two side faces of two adjacent gas tanks 12.

Figure 6:
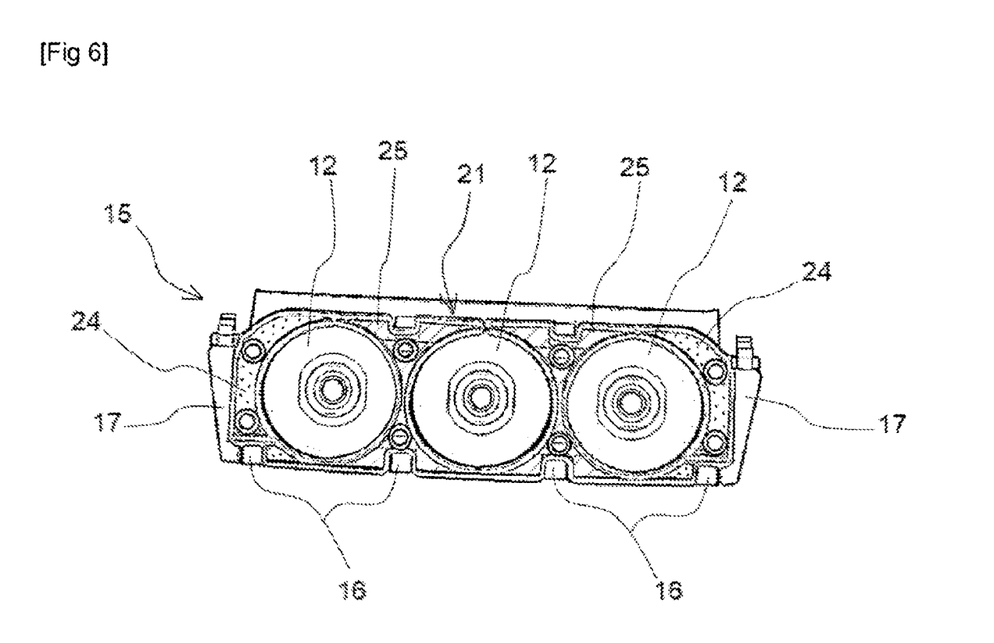
FIG. 6 is a front view of a tray for receiving gas tanks incorporating a shock-absorbing device.

The attached side element 24 and the attached intermediate element 25 are elements that are distinct from one another in order to facilitate their mounting inside the tray 13. Advantageously, as shown in FIG. 6, two side elements 24 and sufficient intermediate elements 25 are provided so that an intermediate element is arranged between two adjacent gas tanks 12. In the example shown with three gas tanks 12, two intermediate elements 25 are provided. More generally, for N tanks, two side elements 24 are provided at each end of the arrangement of gas tanks and N−1 intermediate elements 25, so that all the gas tanks 12 have at least a portion of their cylindrical side face protected by the shock-absorbing device 21. As a variant, the shock-absorbing device 21 may comprise only a single type of element, namely only one or several attached side elements 24 or, one or several attached intermediate elements 25.

Figure 7:
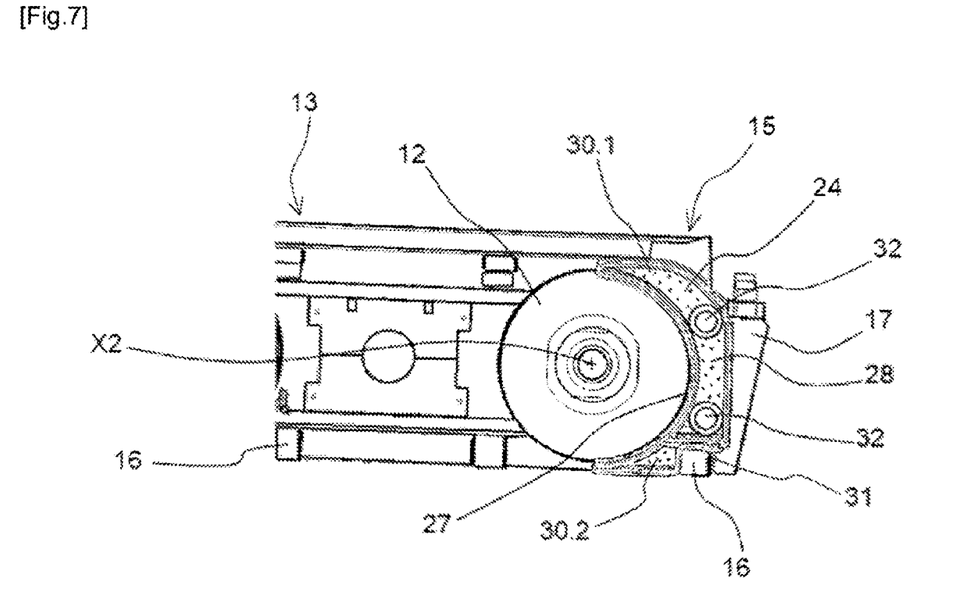
FIG. 7 is a front view of a side element of a shock-absorbing device incorporated into a tray for receiving gas tanks.
Figure 8:
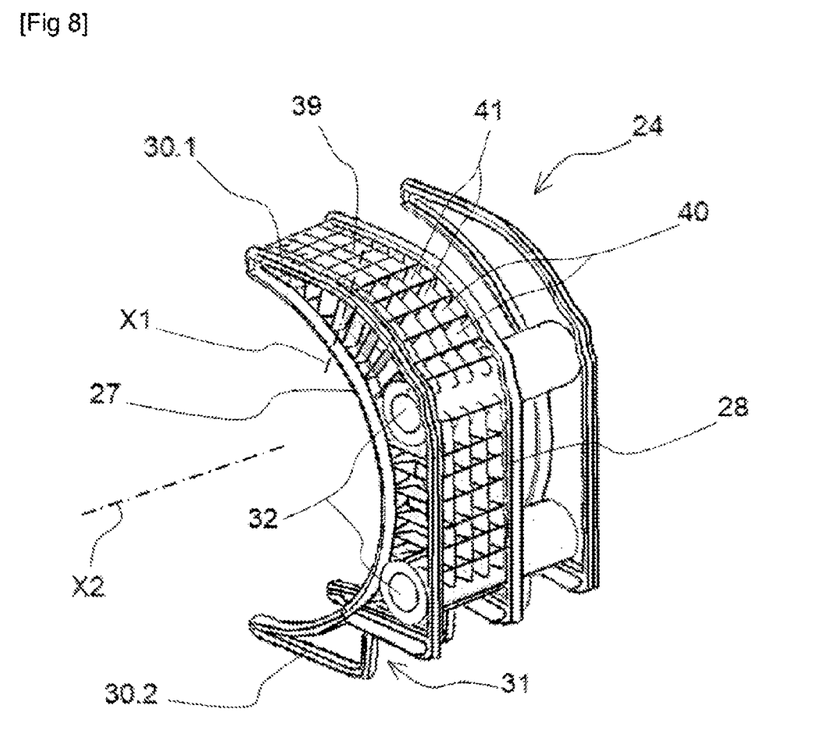
FIG. 8 is a view in perspective of the side element of FIG. 7.
Figure 9:
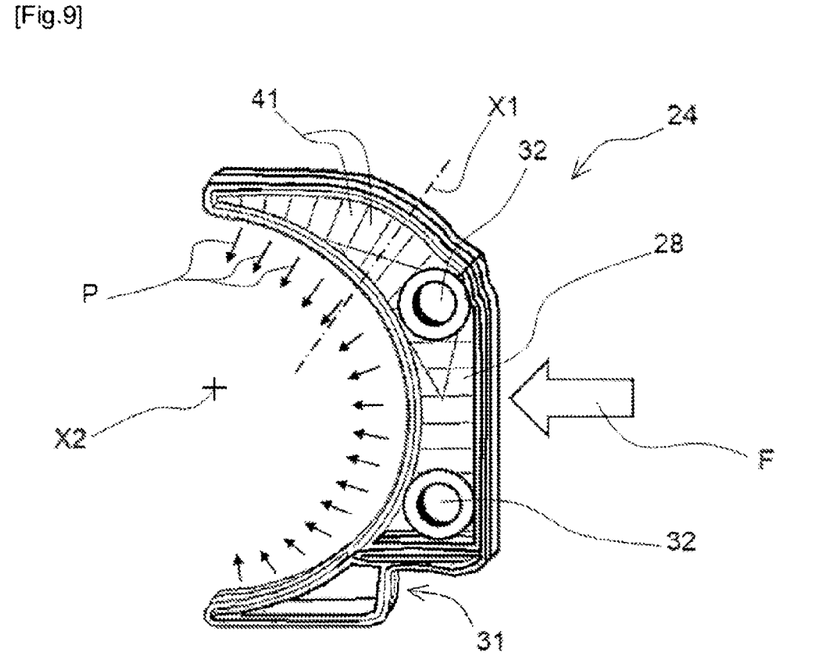
FIG. 9 is a side view of a side element of a shock-absorbing device illustrating a distribution of a force generated by an impact on an inner face cooperating with a gas tank.

More precisely, as can be seen in FIG. 7, the attached side element 24 has an inner face 27 in the form of a cylinder portion cooperating with a portion of the cylindrical side face of a gas tank 12. The side element 24 comprises a vertical wall 28 arranged between a face of the side flange 17 and a portion of the side face of a gas tank 12, as well as two horns 30.1, 30.2 belonging to the vertical wall 28, as can be seen in FIGS. 8 and 9. The vertical wall 28 has a vertical face on the side of the side flange 17 of the tray 13 and an opposite face having the shape of a cylinder portion complementary to the tank 12.

The inner face 27 cooperating with the portion of the cylindrical side face of the gas tank 12 is formed by the inner face of the vertical wall 28 having a shape of a cylinder portion and the two inner faces of the two horns 30.1, 30.2.

The horns 30.1, 30.2 are directed toward a gas tank 12. An inner face of the horns 30.1, 30.2 in the form of a portion of cylinder is situated in the extension of the face of the vertical wall 28 in the form of a portion of cylinder. The horns 30.1, 30.2 have a thickness that decreases when moving from the vertical wall 28 toward the free end of the horns 30.1, 30.2. The side element 24 comprises a recess 31 to allow the passage of a longitudinal member 16 of the tray 13 for receiving of the gas tanks 12. The side element 24 may also comprise at least one gas duct passage orifice 32, in particular two through-orifices 32 for the gas duct passage or more than two through-orifices 32.

Figure 10:
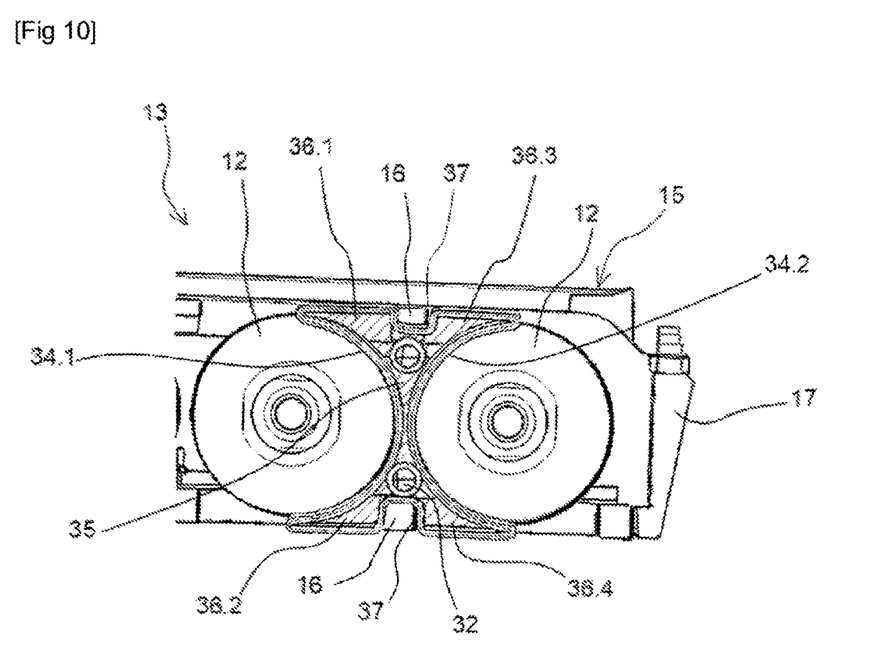
FIG. 10 is a front view of an intermediate element of a shock-absorbing device incorporated in a tray for receiving gas tanks.
Figure 11:
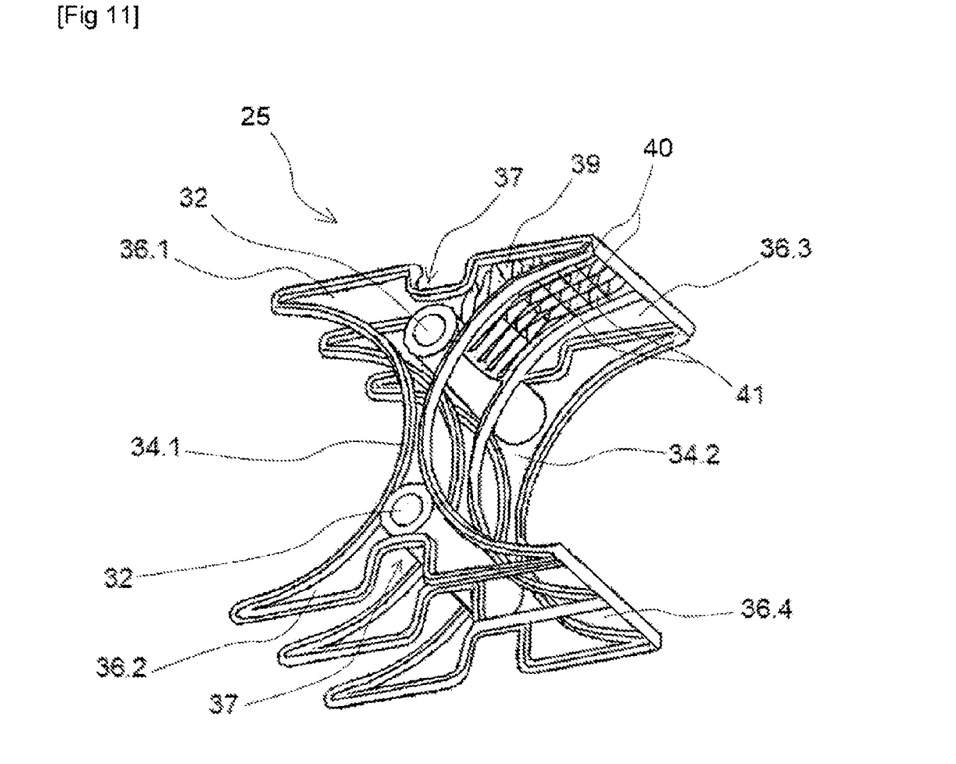
FIG. 11 is a view in perspective of the intermediate element of FIG. 10.

Furthermore, as can be seen in FIGS. 10 and 11, the intermediate element 25 comprises two inner faces 34.1, 34.2 in the form of a portion of cylinder each cooperating with a portion of a side face of a corresponding gas tank 12.

More precisely, the intermediate element 25 comprises a vertical wall 35 arranged between two cylindrical portions of two side faces of two gas tanks 12, as well as horns 36.1-36.4 extending on either side of the vertical wall 35. The intermediate element 25 thus comprises two horns 36.1, 36.2 directed toward a gas tank 12 as well as two opposite horns 36.3, 36.4 directed in an opposite direction toward an adjacent gas tank 12. The horns 36.1-36.4 have a thickness that decreases when moving from the vertical wall 35 toward the free end of the horns 36.1-36.4.

An inner face 34.1, 34.2 cooperating with a portion of a cylindrical side face of a gas tank 12 is formed by an inner face of the vertical wall 35 and the two inner faces of two associated horns 36.1 and 36.2 or 36.3 and 36.4.

The horns 36.1-36.4 have a thickness that decreases when moving from the vertical wall 35 toward the free end of the horns 36.1-36.4. The intermediate element 25 may comprise a groove 37 provided in an upper face and/or in a lower face for the passage of a longitudinal member 16 of the tray 13 receiving the gas tanks 12. The intermediate element 25 may also comprise at least one through-hole 32 for a gas duct passage, in particular two through-orifices 32 or more than two orifices 32.

Advantageously, as shown in FIG. 9, the shock-absorbing device 21, that is, the side element 24 and/or the intermediate element 25, is configured so as to convert a concentrated force F of a lateral impact into a uniform pressure field P applied by the shock-absorbing device 21 on the side face of the tank 12.

To this end, as can be seen in FIGS. 8 and 11, the side element 24 or the intermediate element 25 comprises a hollow body 39 in which ribs 40 forming a plurality of cells 41 are provided. A honeycomb type structure is thus obtained. Advantageously, at least some cells 41 may each have an axis X1 oriented radially relative to an axis X2 of the gas tank 12.

Figure 12A:
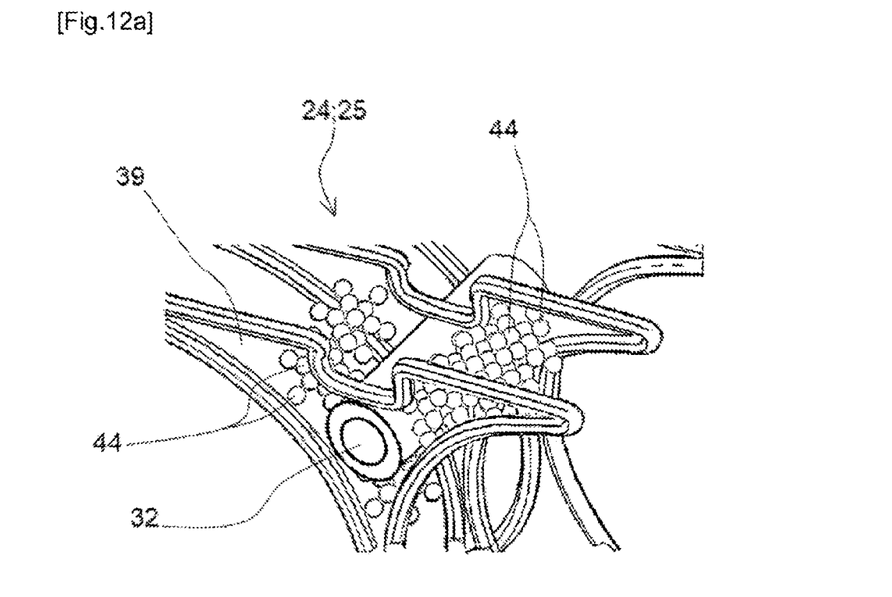
FIG. 12a is a perspective view showing by transparency spheres with a lattice structure arranged inside a hollow body of a side element or an intermediate element.
Figure 12B:
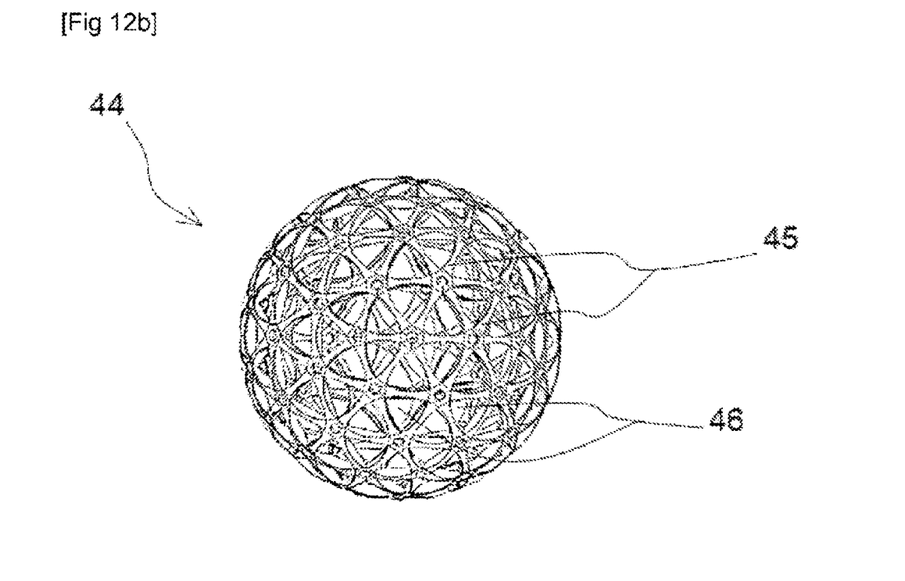

Alternatively, as shown in FIG. 12a, the side element 24 and/or the intermediate element 25 comprises a hollow body 39 in which a plurality of spheres 44 having a lattice structure are arranged. As can be seen in FIG. 12b, such spheres 44 are formed by a combination of solid areas 45 and empty areas 46.

Figure 13A:
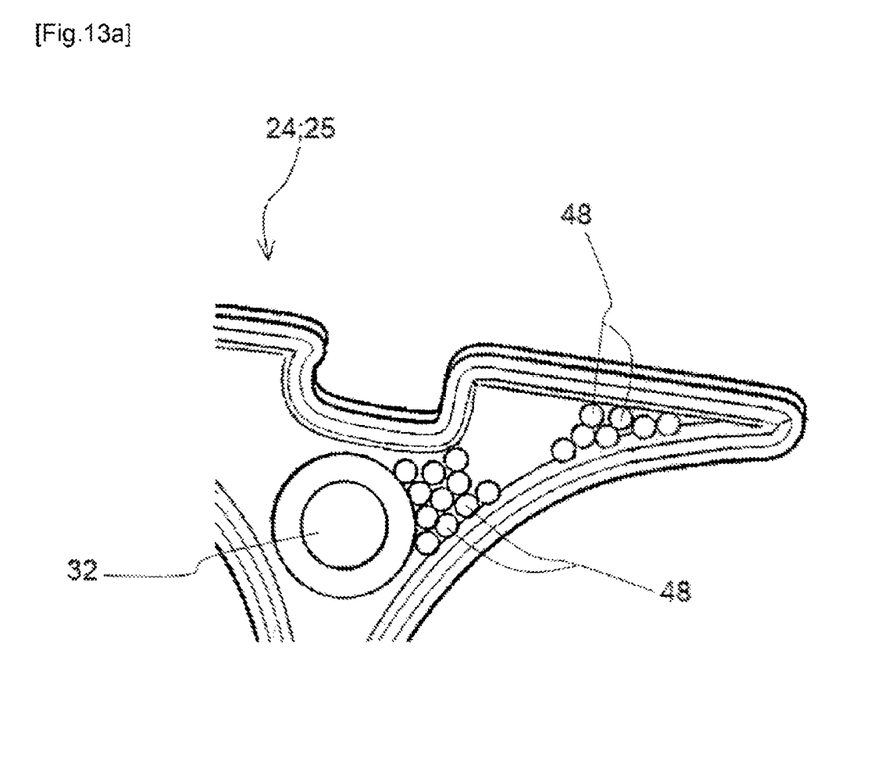
FIG. 13a is a perspective view showing by transparency cylinders with a lattice structure arranged inside a hollow body of a side element or an intermediate element.
Figure 13B:
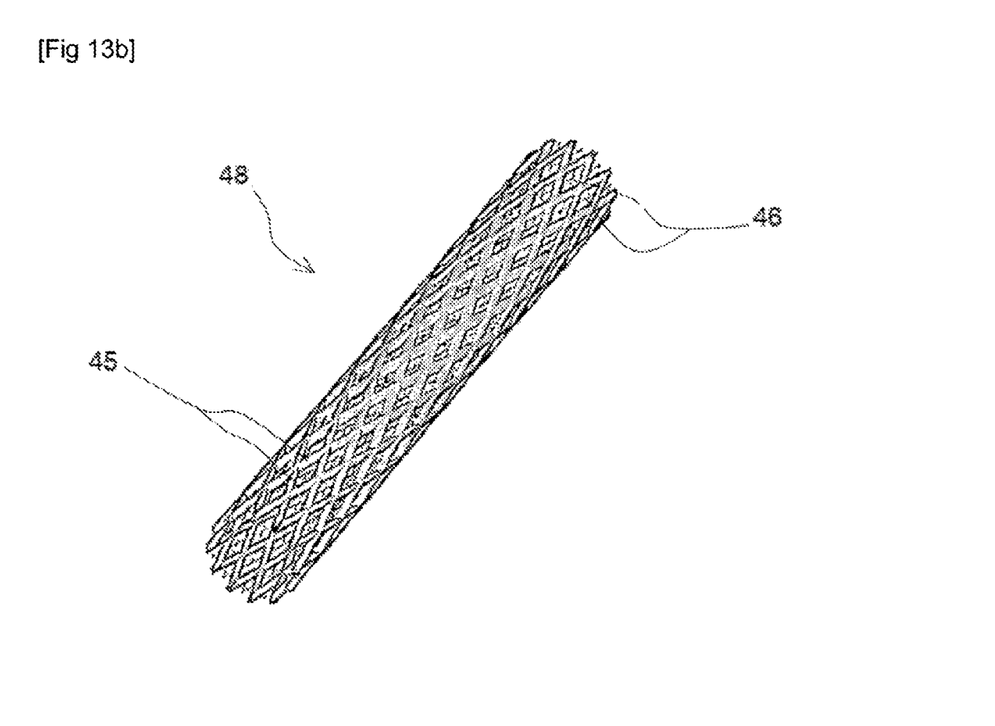

Alternatively, as illustrated by FIG. 13a, the side element and/or the intermediate element 25 comprises a hollow body 39 in which a plurality of cylinders 48 having a lattice structure are arranged. As can be seen in FIG. 13b, such cylinders 48 are formed by a combination of solid areas 45 and empty areas 46.

The side element 24 and/or the intermediate element 25 may be made of a plastic material, such as a polypropylene or a composite material comprising fibers coated with resin, in particular thermosetting. The side element 24 and/or the intermediate element 25 may be produced by molding or by 3D printing, in particular to obtain the lattice structures.

The invention claimed is:

1. A vehicle, in particular a motor vehicle, comprising:
   gas tanks, such as hydrogen tanks, and
   a tray for receiving the gas tanks, said tray comprising elongate longitudinal members and side flanges which, in combination, define a frame, and
   a shock-absorbing device arranged at least between a side flange of the tray for receiving gas tanks and at least a portion of a side face of a gas tank and/or between at least two portions of two side faces of two adjacent gas tanks, said shock-absorbing device comprising a hollow body adapted to at least partially absorb an impact sustained by the vehicle.

2. The vehicle according to claim 1, wherein the tray for receiving the gas tanks comprises reinforcing cross-members, and the shock-absorbing device is situated in a zone of the tray for receiving the gas tanks without a reinforcing cross-member.

3. The vehicle according to claim 1, wherein the shock-absorbing device comprises at least one attached side element arranged between a side flange of the tray and at least a portion of a side face of a gas tank and at least one attached intermediate element arranged between at least two portions of two side faces of two adjacent gas tanks, the attached side element and the attached intermediate element being elements distinct from one another and having a bottom-to-top height substantially sized to contact substantially a full side of the gas tank when said gas tank is received in said tray.

4. The vehicle according to claim 3, wherein the attached side element has an inner face in the form of a portion of a cylinder cooperating with a portion of a cylindrical side face of a tank and a face bearing against at least a portion of a side flange of the frame of the tray for receiving the gas tanks.

5. The vehicle according to claim 3, wherein the attached intermediate element has two inner faces in the form of a portion of cylinder each cooperating with a portion of a side face of a corresponding gas tank.

6. The vehicle according to claim 1, wherein the shock-absorbing device comprises a hollow body in which ribs forming a plurality of hollow cells are arranged.

7. The vehicle according to claim 1, wherein the shock absorbing device comprises a hollow body in which a plurality of spheres having a lattice structure are arranged.

8. The vehicle according to claim 1, wherein the shock-absorbing device comprises a hollow body in which a plurality of cylinders having a lattice structure are arranged.

9. The vehicle according to claim 1 wherein said hollow body of said shock absorbing device is filled with force-attenuating elements.

10. The vehicle according to claim 9 wherein said force-attenuating elements comprise ribs forming a plurality of hollow cells within said hollow body, spheres having a lattice structure which are arranged within said hollow body, or cylinders having a lattice structure which are arranged within said hollow body.

11. A vehicle, in particular a motor vehicle, comprising:
    gas tanks, such as hydrogen tanks, and
    a tray for receiving the gas tanks comprising a frame formed by side members and side flanges, wherein said vehicle further comprises a shock-absorbing device arranged at least between a side flange of the tray for receiving gas tanks and at least a portion of a side face of a gas tank and/or between at least two portions of two side faces of two adjacent gas tanks, so as to be able to at least partially absorb an impact sustained by the vehicle,
    wherein the shock-absorbing device comprises at least one attached side element arranged between a side flange of the tray and at least a portion of a side face of a gas tank and at least one attached intermediate element arranged between at least two portions of two side faces of two adjacent gas tanks, the attached side element and the attached intermediate element being elements distinct from one another, and
    wherein the attached side element and/or the attached intermediate element comprise(s) at least one duct passage orifice.

12. A vehicle, in particular a motor vehicle, comprising:
    gas tanks, such as hydrogen tanks, and
    a tray for receiving the gas tanks comprising a frame formed by side members and side flanges, wherein said vehicle further comprises a shock-absorbing device arranged at least between a side flange of the tray for receiving gas tanks and at least a portion of a side face of a gas tank and/or between at least two portions of two side faces of two adjacent gas tanks, so as to be able to at least partially absorb an impact sustained by the vehicle; wherein the shock-absorbing device comprises:
a hollow body in which ribs forming a plurality of hollow cells are arranged, or
a hollow body in which a plurality of spheres having a lattice structure are arranged; or
a hollow body in which a plurality of cylinders having a lattice structure are arranged.

* * * * *